United States Patent
Liu et al.

(10) Patent No.: US 9,650,484 B2
(45) Date of Patent: May 16, 2017

(54) FIRE-RESISTANT POLYURETHANE MATERIAL AND FIRE-RESISTANT STRUCTURE

(71) Applicant: INOMA Corporation, Taipei (TW)

(72) Inventors: Cheng-Dar Liu, Tainan (TW); Che-I Kao, Tainan (TW); Buh-Luen Chen, Tainan (TW); Yu-Chi Wang, Tainan (TW); Ying-Chang Su, Tainan (TW)

(73) Assignee: INOMA Corporation, Taipei (TW)

( * ) Notice: Subject to any disclaimer, the term of this patent is extended or adjusted under 35 U.S.C. 154(b) by 0 days.

(21) Appl. No.: 14/410,485

(22) PCT Filed: Jun. 28, 2013

(86) PCT No.: PCT/US2013/048520
§ 371 (c)(1),
(2) Date: Dec. 22, 2014

(87) PCT Pub. No.: WO2014/004995
PCT Pub. Date: Jan. 3, 2014

(65) Prior Publication Data
US 2015/0344656 A1 Dec. 3, 2015

(30) Foreign Application Priority Data

Jun. 28, 2012 (TW) .............................. 101123323 A

(51) Int. Cl.
| | |
|---|---|
| *C08J 9/00* | (2006.01) |
| *B32B 5/32* | (2006.01) |
| *C08G 18/48* | (2006.01) |
| *C08L 75/04* | (2006.01) |
| *C08J 9/10* | (2006.01) |
| *C08J 9/32* | (2006.01) |
| *C08K 5/00* | (2006.01) |
| *C08G 101/00* | (2006.01) |

(52) U.S. Cl.
CPC ............... *C08J 9/0095* (2013.01); *B32B 5/32* (2013.01); *C08G 18/48* (2013.01); *C08J 9/0066* (2013.01); *C08J 9/10* (2013.01); *C08J 9/32* (2013.01); *C08K 5/0066* (2013.01); *C08L 75/04* (2013.01); *B32B 2264/0235* (2013.01); *B32B 2264/0257* (2013.01); *B32B 2264/10* (2013.01); *B32B 2266/0278* (2013.01); *B32B 2307/3065* (2013.01); *C08G 2101/005* (2013.01); *C08J 2375/04* (2013.01); *C08J 2375/08* (2013.01); *C08L 2203/14* (2013.01); *Y10T 428/249974* (2015.04)

(58) Field of Classification Search
CPC ....... C08J 9/0095; C08J 2375/08; B32B 5/32; B32B 5/145; Y10T 428/249961; Y10T 428/249989
See application file for complete search history.

(56) References Cited

U.S. PATENT DOCUMENTS

| | | | | |
|---|---|---|---|---|
| 3,615,972 A | * | 10/1971 | Morehouse, Jr. | ........ B01J 13/18 156/276 |
| 2002/0052425 A1 | * | 5/2002 | Kaku | ................. C08G 18/4072 521/137 |
| 2010/0190880 A1 | * | 7/2010 | Kamm | ................... C08G 18/12 521/137 |

* cited by examiner

*Primary Examiner* — Hai Vo
(74) *Attorney, Agent, or Firm* — WPAT, P.C., Intellectual Property Attorneys; Anthony King

(57) ABSTRACT

The invention relates to a fire-resistant polyurethane material comprising a foamed polyurethane main body, a fire-resistant inorganic powder and a hollow structure. The density of the hollow structure is lower than about 0.1 g/cm$^3$ and the material of the hollow structure is selected from the group consisting of polymer, glass and ceramic. The fire-resistant polyurethane material according to the invention has excellent fire-resistant effects. The invention also provides a fire-resistant structure.

4 Claims, No Drawings

FIRE-RESISTANT POLYURETHANE MATERIAL AND FIRE-RESISTANT STRUCTURE

BACKGROUND OF THE INVENTION

1. Field of the Invention

The invention relates to a fire-resistant material. Particularly, the invention relates a fire-resistant polyurethane material and a fire-resistant polyurethane structure.

2. Description of the Related Art

Polyurethane materials are a type of widely used polymeric materials. Polyurethane products can be found in almost all aspects of daily life; especially foamed polyurethanes are an important type of materials. Because foamed polyurethanes can be foamed in a mould, articles of desired shapes, for example, connection boards, decor sheets and decorative pieces that are commonly found in building decoration, can be produced, and are used to replace time-consuming, labor-intensive, expensive and heavy stone or wood materials. Therefore, foamed polyurethanes have been main materials in current in-door decoration.

However, when being used as decorating materials, these foamed polyurethane materials face a great challenge in fire resistance and fire fighting. The polyurethane materials do not have fire-resistant properties, so when contacting a fire source, the polyurethane materials would be quickly burnt and melted, resulting in expansion of the fire hazard. Therefore, it is an important topic in this field to improve foamed polyurethane materials and impart the foamed polyurethane materials with fire-resistant properties.

Currently, a method for improving the fire-resistant properties of the foamed polyurethane materials is to add a sufficient amount of a fire-resistant powder to the polyurethane materials. The fire-resistant powder includes, for example, aluminum hydroxide; a nitrogen-based fire-resistant component such as melamine, which releases nitrogen and ammonia gas when being heated, so as to reduce the concentration of a combustible gas; a phosphorus-based fire-resistant component such as ammonium polyphosphate, which produces metaphosphoric acid when being heated, so as to dehydrate organic substances; and a carbon-based fire-resistant component such as pentaerythritol. Although addition of these components can significantly improve the fire-resistant properties of foamed polyurethane materials, the foamability of the polyurethane materials is greatly reduced. Furthermore, the polyurethane materials cannot fully fill all corners in a cavity of a foaming mould, and fine features on the surface cannot be obtained. In addition, due to the addition of the fire-resistant components, the total weight of the foamed polyurethane materials is increased, which is not beneficial to use in indoor decoration.

Therefore, there is an urgent need to set forth a fire-resistant polyurethane material and a fire-resistant structure having the foamability of a foamed polyurethane material and improved weight, so as to meet development requirements in the various fields of application.

SUMMARY OF THE INVENTION

In the present invention, a fire-resistant inorganic powder and a hollow structure are used together to obtain a fire-resistant polyurethane material and fire-resistant structure having the foamability of a foamed polyurethane material and improved weight, so as to meet development requirements of polyurethane materials in the various fields of application.

Therefore, the present invention provides a polyurethane material comprising:
- a foamed polyurethane main body;
- a fire-resistant inorganic powder; and
- a hollow structure, wherein the density of the hollow structure is lower than about 0.1 $g/cm^3$ and the material of the hollow structure is selected from the group consisting of polymer, glass and ceramic.

The present invention also provides a fire-resistant structure, which comprises:
- a compact layer comprising a foamed polyurethane; and
- a main doped layer comprising a foamed polyurethane doped with a fire-resistant inorganic powder and a hollow structure, where the density of the hollow structure is less than about 0.1 $g/cm^3$, and the material of the hollow structure is selected from the group consisting of polymer, glass and ceramic.

DETAILED DESCRIPTION OF THE INVENTION

The invention provides a polyurethane material comprising a foamed polyurethane main body, a fire-resistant inorganic powder and a hollow structure. The density of the hollow structure is lower than about 0.1 $g/cm^3$ and the material of the hollow structure is selected from the group consisting of polymer, glass and ceramic.

The foamed polyurethane main body according to the present invention is a main portion of the polyurethane material, and the degree of foaming, the foaming density and/or the foam size are determined according to the purpose of application. The foamed polyurethane main body may be produced by persons of ordinary sill in the art according to the purpose. The amount of the foamed polyurethane main body may be determined according to the desired fire-resistant properties, foamability and weight of the material. In a preferred embodiment of the present invention, the content of the foamed polyurethane main body is about 30 wt % to about 40 wt %.

The fire-resistant inorganic powder according to the present invention is an inorganic powder having fire-resistant effects. Preferably, the fire-resistant inorganic powder may be a powder capable of reducing the total heat release of a material, and in a embodiment of the present invention, the fire-resistant inorganic powder is selected from the group consisting of zinc borate, graphite, magnesium hydroxide, aluminum hydroxide, calcium carbonate, silicon fume, clay, polyhedral oligosilsesquioxane (POSS), expanded graphene and a mixture thereof In a preferred embodiment of the present invention, the fire-resistant inorganic powder is a crystal that can release water of crystallization when being heated, such as magnesium hydroxide and aluminum hydroxide. In another preferred embodiment of the present invention, the fire-resistant inorganic powder is a crystal that can release carbon dioxide when being heated, such as calcium carbonate and zinc borate. In yet another preferred embodiment of the present invention, the fire-resistant inorganic powder is a powder that can release carbon dioxide when being heated, such as calcium carbonate, zinc borate and expanded grapheme, where the expanded graphene has a layered structure and a functional group capable of releasing carbon dioxide when being heated, so that a spacing between layers is increased, thereby preventing the fire source from contacting the foamed polyurethane main body. In a more preferred embodiment of the present invention, the fire-resistant inorganic powder is aluminum hydroxide.

The amount of the fire-resistant inorganic powder may be determined according to the desired fire-resistant properties, foamability and weight of the material, and in a preferred embodiment of the present invention, the content of the fire-resistant inorganic powder is about 50 wt % to about 60 wt %.

The hollow structure of the present invention refers to a structure with a space in the center, and is characterized in that the density of the hollow structure is low due to the space in the center of the hollow structure, and is less than about 0.1 g/cm$^3$, preferably less than about 0.05 g/cm$^3$, more preferably less than about 0.03 g/cm$^3$, and particularly preferably in a range of about 0.05 g/cm$^3$ to about 0.03 g/cm$^3$. Without limitation by theory, it is believed that due to low density of the hollow structure, the total weight of the material is reduced, and the amount of the foamed polyurethane main body is decreased; moreover, due to the decrease of the amount of the foamed polyurethane main body, the organic components in the material is reduced, thereby reducing the total heat release of the material, and achieving the purpose of fire resistance. On the other hand, due to the low density of the hallow structure, the polyurethane material can first fully fill a cavity of a foaming mould when be foamed, especially fine features on the surface, thereby overcoming the disadvantage that the polyurethane material cannot fully fill all corners of the cavity of the foaming mould due to significantly decreased foamability by adding fire-resistant components.

The material of the hollow structure of the present invention is selected from the group consisting of polymer, glass and ceramic, and persons of ordinary skill in the art can produce the hollow structure with a space in the center by using such materials. In a embodiment of the present invention, the hollow structure is a polymeric material selected from the group consisting of foamed polystyrene and foamed polypropylene. In another embodiment of the present invention, the hollow structure is a glass material, which is melted at high temperature after burning and is cemented, so that the foamed polyurethane main body is prevented from contacting the fire source, thereby improving the fire-resistant effect.

The shape and size of the hollow material are not specifically limited, provided that the properties of the polyurethane material are matched. The particle size of the hollow structure is preferably less than about 5 mm, more preferably about 1 mm to about 5 mm.

The amount of the hollow structure may be determined according the desired fire-resistant property, foamability and weight of the material, and in a preferred embodiment of the present invention, the content of the hollow structure is about 0.5 wt % to about 5 wt %.

In a preferred embodiment of the present invention, the polyurethane material may further include another fire-resistant component, for example, a nitrogen based fire-resistant component such as melamine; a phosphorus based fire-resistant component such as ammonium polyphosphate; and a carbon based fire-resistant component such as pentaerythritol.

In a preferred embodiment of the present invention, the polyurethane material further includes an additive to improve the properties of the composition. The type, component and content of the additive may be determined according to the demand, and the additive may be, for example, a dispersing agent, a thermal insulating agent, a structure reinforcing agent, a binder, a surfactant, a pigment, a dye, an anti-cracking agent, a waterproofing agent, an anti-UV agent, antibacterial agent, an antimycotic agent and a carbon-forming agent.

The polyurethane material of the present invention may be used in fields of various foamed polyurethane materials, preferably in building materials, more preferably in building materials for in-door decoration, and particularly preferably in connection boards, decor sheets and decorative pieces.

The present invention further provides a fire-resistant structure, which comprises: a compact layer comprising a foamed polyurethane; and a main doped layer comprising a foamed polyurethane doped with a fire-resistant inorganic powder and a hollow structure, where the density of the hollow structure is less than about 0.1 g/cm$^3$, and the material of the hollow structure is selected from the group consisting of polymer, glass and ceramic.

The fire-resistant structure according to the present invention is formed from the polyurethane material. Due to the low density of the hollow structure, when being foamed, the doped foamed polyurethane and the fire-resistant inorganic powder can first fully fill a cavity of a mould to form the main doped layer, which is preferably located on the surface of the fire-resistant structure, and then, the foamed polyurethane main body is foamed in the cavity of the mould. Because the component of the foamed polyurethane main body is simple, the compact layer is formed.

By adopting the hollow structure of the present invention, the total heat release can be significantly reduced from about 16 MJ/cm$^2$ to about 24 MJ/cm$^2$ to about 8 MJ/cm$^2$, so as to meet the current requirements of regulations on the fire-resistant materials. In the burning test, the surface is not penetrated, so that the main doped layer can completely prevent the compact layer against from contacting the fire source. The compact layer is merely melted at a high temperature without burning, thus being an excellent fire-resistant structure.

The following examples are given for the purpose of illustration only and are not intended to limit the scope of the present invention.

EXAMPLES

A fire-resistant composition is formulated with components in Table 1 below:

TABLE 1

| | |
|---|---:|
| Polyurethane foaming agent B isocyanate | 8.62 g |
| Polyurethane foaming agent A polyether glycol | 5.74 g |
| Wet dispersing agent 2280 | 0.27 g |
| Wet dispersing agent DisperBYK-110 | 0.15 g |
| Aluminum hydroxide (particle size: 1 µm) | 8.44 g |
| Aluminum hydroxide (particle size: 8 µm) | 5.64 g |
| Aluminum hydroxide (particle size: 55 µm) | 16.00 g |
| Melamine | 0.43 g |
| Ammonium polyphosphate | 2.26 g |
| Pentaerythritol | 0.14 g |
| Glass fiber | 1.06 g |
| Foaming agent HFC-365mfc | 5 g |
| Zinc borate | 1.06 g |

Melamine is the nitrogen source, and releases nitrogen and ammonia gas when being heated to reduce the concentration of the inflammable gas; ammonium polyphosphate is the dehydrating agent, and produces metaphosphoric acid when being heated to dehydrate the organics; pentaerythritol is the carbon-forming agent, and produces a non-inflammable carbide after dehydration; glass fiber can reinforce the material structure before being burnt, and is in a melting state when being burnt to enhance the strength of the charring layer; and the foaming agent may also be n-pentane or cyclopentane, but the fire-resistant structure is required to stand for 24 hours in an oven at 60° C. after being molded, so as to evaporate the foaming agent remaining in the material.

The manufacturing method is as follows:

(a) 8.44 g, 5.64 g and 16 g types of aluminum hydroxide having a particle size: 1 μm, 8 μm and 55 μm are respectively weighed, 0.43 g melamine, 2.26 g ammonium polyphosphate, 0.14 g pentaerythritol are added, and the mixtures are homogeneously mixed by using a powder agitator for use.

(b) 0.27 g wet dispersing agent 2280 and 0.15 g Disper-BYK110 are added into 5.74 g polyurethane foaming agent A, and stirred, and then 5 g foaming agent is added, and the mixture is homogeneously mixed with 16.5 g mixed powder from step (a).

(c) The remaining mixed powder from step (a) is mixed with 8.62 g polyurethane foaming agent B for 2 minutes by using a mechanical stirrer at rotation rate of 1,000 rpm, polyurethane foaming agent A from step (b) is added, and stirred for 30 seconds by the mechanical stirrer at 1,000 rpm, and then 1.06 g zinc borate and 1.06 g glass fiber is added and stirred continuously for 30 seconds.

(d) The mixture is poured into a foaming mould, and the density of materials is controlled to be 0.15 to 0.3 g/cm$^3$, the mould is maintained at 40° C. and aged for 1 hour, to obtain the fire-resistant structure.

The text results of the fire-resistant structure according to various testing standards are listed in table 2.

TABLE 2

| | Testing Standard | International Standard ISO5660 and ASTM E1354 Method for testing heat release rate of combustion of building materials-cone calorimeter method | |
|---|---|---|---|
| | | Fire-resistant material of the present invention (test 1) | Fire-resistant material of the present invention (test 2) |
| Specimen data | Specimen No. | | |
| | Thickness of specimen (mm) | 9.6 | 9.4 |
| | Heating area of specimen (cm$^2$) | 88.4 | |
| | Weight before testing of specimen (g) | 33.2 | 28.1 |
| | Heating time (sec$^2$) | 600 | |
| Assessment | Total heat release of less than 8 MJ/m$^2$ | Total heat release of 6.8 MJ/m$^2$ | Total heat release of 6.1 MJ/m$^2$ |
| | No maximal heat release of more than 200 kW/m$^2$ over 10 seconds | None | None |
| | No crack and void penetrating to the back | None | None |
| Note | Results | Pass | Pass |
| | Sample description | Sample density of about 0.3 g/cm$^3$; 60 wt % ATH | Sample density of about 0.28 g/cm$^3$; 60 wt % ATH |

(Note row also includes: "side, detrimental to fire resistance")

Table 2 shows the testing standards for International Standard ISO5660 and ASTM E1354. With the specimen being coated onto the foamable polystyrene (EPS) plate to different densities, and the results show that the fire-resistant material according to the present invention meets the specification of International Standard ISO5660 and ASTM E1354.

While embodiments of the present invention have been illustrated and described, various modifications and improvements can be made by persons skilled in the art. It is intended that the present invention is not limited to the particular forms as illustrated, and that all modifications not departing from the spirit and scope of the present invention are within the scope as defined in the following claims.

What is claimed is:

1. A fire-resistant structure, which comprises:
   a compact layer consisting of a foamed polyurethane; and
   a main doped layer comprising 30 wt % to 40 wt % of a foamed polyurethane, the foamed polyurethane doped with a fire-resistant inorganic powder and a hollow structure, wherein a density of the hollow structure is less than about 0.1 g/cm$^3$, the material of the hollow structure is selected from the group consisting of foamed polystyrene and foamed polypropylene, and the hollow structure is a structure with a space in the center.

2. The fire-resistant structure according to claim 1, wherein the fire-resistant inorganic powder is selected from the group consisting of zinc borate, graphite, magnesium hydroxide, aluminum hydroxide, calcium carbonate, silicon fume, clay, polyhedral oligosilsesquioxane (POSS), expanded graphene and a mixture thereof.

3. The fire-resistant structure according to claim 1, wherein a particle size of the hollow structure is less than about 5 mm.

4. The fire-resistant structure according to claim 1, which further comprises an additive, and the additive is selected from the group consisting of a dispersing agent, a thermal insulating agent, a structure reinforcing agent, a binder, a surfactant, a pigment, a dye, an anti-cracking agent, a waterproofing agent, an anti-UV agent, antibacterial agent, an antimycotic agent and a carbon-forming agent.

* * * * *